United States Patent
Mhetar et al.

(10) Patent No.: US 7,015,285 B2
(45) Date of Patent: Mar. 21, 2006

(54) COMPOSITION AND METHOD FOR IMPROVING THE ADHESION OF POLYPHENYLENE ETHER MOLDINGS TO POLYURETHANE FOAM

(75) Inventors: Vijay Mhetar, Slingerlands, NY (US); Ganesh Kannan, Bangalore (IN)

(73) Assignee: General Electric, Pittsfield, MA (US)

( * ) Notice: Subject to any disclaimer, the term of this patent is extended or adjusted under 35 U.S.C. 154(b) by 282 days.

(21) Appl. No.: 10/325,724

(22) Filed: Dec. 18, 2002

(65) Prior Publication Data

US 2004/0122159 A1 Jun. 24, 2004

(51) Int. Cl.
| | |
|---|---|
| *C08F 8/00* | (2006.01) |
| *C08G 63/48* | (2006.01) |
| *C08G 63/91* | (2006.01) |
| *C08L 61/04* | (2006.01) |
| *C08L 71/12* | (2006.01) |

(52) U.S. Cl. .................. 525/132; 525/68; 525/92 D; 525/95; 525/905
(58) Field of Classification Search ............... 525/68, 525/92 D, 95, 905, 132
See application file for complete search history.

(56) References Cited

U.S. PATENT DOCUMENTS

| | | |
|---|---|---|
| 4,386,176 A | 5/1983 | Fukuda et al. |
| 4,410,651 A | 10/1983 | Haaf et al. |
| 4,442,251 A | 4/1984 | Haaf et al. |
| 4,454,284 A | 6/1984 | Ueno et al. |
| 4,871,800 A | 10/1989 | Fujii et al. |
| 4,892,904 A | 1/1990 | Ting |
| 5,370,813 A | 12/1994 | DeNicola, Jr. et al. |
| 5,756,196 A | 5/1998 | Chao et al. |
| 6,303,216 B1 | 10/2001 | Chao et al. |

FOREIGN PATENT DOCUMENTS

| | | |
|---|---|---|
| EP | 0808871 | 6/1989 |
| EP | 0849329 | 12/1997 |

OTHER PUBLICATIONS

JP 2199164. Publication Date Aug. 7, 1990, Abstract Only (1pg).

*Primary Examiner*—Patrick D. Niland

(57) ABSTRACT

This invention provides a composition and method for improving adhesion between a resinous thermoplastic substrate and polyurethane foam, said composition comprising at least one polyphenylene ether, at least one poly(alkenylaromatic) compound, and at least one carboxylic acid containing copolymer and optionally, further comprising at least one curing catalyst. Another embodiment of the invention provides articles derived from the composition of the present invention.

20 Claims, No Drawings

COMPOSITION AND METHOD FOR IMPROVING THE ADHESION OF POLYPHENYLENE ETHER MOLDINGS TO POLYURETHANE FOAM

BACKGROUND OF THE INVENTION

Polyphenylene ether resins generally show outstanding mechanical properties, thermal resistance, electrical characteristics, and flame resistance and are commonly used in a broad range of applications such as components in automobiles. In particular, various internal components in automobiles such as, e.g., instrument panels, arm rests, and top covers, require a high degree of thermal resistance making polyphenylene ether resin compositions ideally suited. Many of these same internal components are covered with a foamed polyurethane due to its desirable characteristics; however, polyphenylene ether resin compositions ordinarily have poor adhesion to foamed polyurethane.

Various methods have been developed to enhance the adhesive properties between polyphenylene ether resin compositions and foamed polyurethane. For example, U.S. Pat. No. 5,370,813 describes the addition of various primary and secondary amines to compositions of polyphenylene ether resin and alkenyl aromatic resins. Although adhesion is significantly enhanced, unpleasant "ammonia-like" odors have been reported due to the amines under abusive molding conditions.

In Japanese Unexamined Patent Application H2-199164, terpene phenol resin has been added compositions of polyphenylene ether resin and alkenyl aromatic resins; however, the adhesive properties of these compositions are still deficient. Various polar resins, e.g., styrene-maleic anhydride copolymer have also been used in compositions of polyphenylene ether resin and alkenyl aromatic resins with limited success due to laminar peeling during molding and decreased mechanical properties. EP 0808871 discloses a resin composition of polyphenylene ether and polystyrene with enhanced adhesion and reduced laminar peeling from polyurethane brought about by the use of an ethylene-unsaturated carboxylic acid ester copolymer. However, in spite of the various methods of the prior art there remains a need for improved methods and compositions for enhanced adhesion of polyphenylene ether resin compositions with polyurethane foam.

SUMMARY OF THE INVENTION

The present invention provides a composition having improved adhesion to polyurethane foam, said composition comprising at least one polyphenylene ether, at least one poly(alkenylaromatic) compound and at least one carboxylic acid containing copolymer derived from one or more olefins and one or more olefinic carboxylic acids. The composition may optionally further comprise at least one curing catalyst.

In a preferred embodiment, the olefinic carboxylic acid residue in the copolymer is present from about 1 to 35 weight percent, preferably from about 5 to 25 weight percent. In another preferred embodiment, the carboxylic acid containing copolymer is present in an amount effective to provide adhesion of urethane foam to the composition. In yet another preferred embodiment, the composition is substantially free of ammonia-like odors.

Another embodiment of the invention is to provide a method for improving the adhesion between a resinous thermoplastic substrate and a polyurethane foam wherein the method comprises blending at least one polyphenylene ether, at least one poly(alkenylaromatic) compound and at least one carboxylic acid containing copolymer derived from one or more olefins and one or more olefinic carboxylic acids, wherein the method optionally further comprising at least one curing catalyst. In accordance with this invention, there is provided a thermoplastic article of manufacture that has enhanced adhesion to polyurethane foam and is useful as an automotive interior component such as an instrument panel.

DESCRIPTION OF THE INVENTION

The inventors have found that, the principal components of the inventive composition that will yield a resinous thermoplastic substrate with enhanced adhesion to polyurethane foam are: a thermoplastic mixture or blend of at least one polyphenylene ether, at least one poly(alkenylaromatic) compound, at least one carboxylic acid containing copolymer and optionally, at least one curing catalyst. Other components can be present in the composition such as flame retardants, impact modifiers, mold releases, antioxidants, stabilizers, fillers, and mixtures thereof.

Representative examples of polyphenylene ethers are known polymers comprising a plurality of structural units of the formula I:

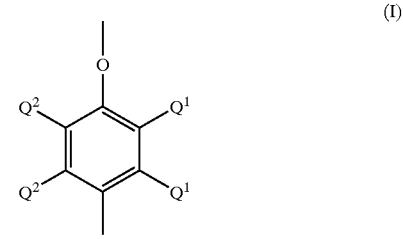

wherein in each of said units independently, each $Q^1$ is independently halogen, primary or secondary lower alkyl (i.e. alkyl containing up to seven carbon atoms), phenyl, haloalkyl, aminoalkyl, hydrocarbonoxy, or halohydrocarbonoxy, wherein at least two carbon atoms separate the halogen and the oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$-alkyl, and each $Q^2$ is hydrogen.

Both homopolymer and copolymer polyphenylene ethers are included. The preferred homopolymers are those containing 2,6-dimethyl-1,4-phenylene ether units. Suitable copolymers include random copolymers containing such units in combination with, for example, 2,3,6-trimethyl-1,4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals, undergo reaction in known manner with the hydroxy groups of polyphenylene ether chains to produce a higher molecular weight polymer.

The polyphenylene ether resins generally have a number average molecular weight in a range between about 3,000 and 40,000 in one embodiment of the present invention. The polyphenylene ether resins generally have an intrinsic viscosity (i.v.) in the range between about 0.15 and about 0.6 dl./g., as measured in chloroform at 25° C.

The polyphenylene ethers may be typically prepared by the oxidative coupling of at least one monohydroxyaromatic compound such as 2,6-xylenol or 2,3,6-trimethylphenol using methods known in the art. Catalyst systems are generally employed for such coupling and they typically contain at least one heavy metal compound such as copper, manganese, or cobalt compound, usually in combination with various other materials.

Particularly useful polyphenylene ethers for many purposes are those that comprise molecules having at least one aminoalkyl-containing end group. The aminoalkyl radical is typically located in an ortho position to the hydroxy group. Products containing such end groups may be obtained by incorporating an appropriate acid containing copolymer as one of the constituents of the oxidative coupling reaction mixture. Also frequently present are 4-hydroxybiphenyl end groups, typically obtained from reaction mixtures in which a by-product diphenoquinone is present. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

The poly(alkenylaromatic) compounds employed in the thermoplastic resinous substrate composition include homopolymers and copolymers of such compounds as styrene, alpha.-methylstyrene, 4-methylstyrene and dibromostyrene. Polystyrene may be used in some embodiments. In many embodiments conventional rubber-modified polystyrenes, sometimes designated "high impact polystyrene" or "HIPS" may be used.

While polyphenylene ether and poly(alkenylaromatic) compound blends containing any proportion of the two resins may be employed in some embodiments, the polyphenylene ether may be present in amounts of at least about 20% by weight based on the weight of the two polymers, preferably between about 20 and 80% by weight based on the total weight of the polyphenylene ether and poly(alkenylaromatic) compound materials. In one embodiment the amount of polyphenylene ether in the polyphenylene ether-poly(alkylene aromatic) compound blend may be in a range between about 20% by weight and about 60% by weight based on the total weight of these two polymeric materials.

The polyphenylene ether and poly(alkenylaromatic) compound mixture or blend may also contain conventional additives, especially flame retardant additives and impact modifiers. Flame retardant additives include brominated polystyrenes and phosphorus-containing chemicals such as triphenylphosphate, tri-t-butylphenylphosphate, tetraphenyl resorcinol bisphosphate, tetraxylyl resorcinol bisphosphate, tetraphenylhydroquinone bisphosphate and tetraxylyl hydroquinone bisphosphate.

Impact modifiers for polyphenylene ether-poly(alkenylaromatic) compound mixtures or blends known in the art may also be employed. They include diblock and triblock copolymers of alkenylaromatic compounds such as styrene with aliphatic dienes such as butadiene and isoprene. The diene-derived blocks in said copolymers may be substantially saturated or may possess substantial unsaturation. One or more impact modifiers can be used. The composition may also include mold release compounds such as polyethylene.

Also as noted above, another principal ingredient in the composition is a carboxylic acid containing copolymer. The carboxylic acid containing copolymer useful in the present invention is derived from one or more olefins and one or more olefinic carboxylic acids. Useful olefins include ethylene, propylene, 1-butene, 1,3-butadiene, isoprene, styrene, α-methyl styrene, and the like. Useful olefinic carboxylic acids include acrylic acid, methacrylic acid, fumaric acid and maleic acid. The olefinic carboxylic acid residue in the copolymer is present from about 1 to 35 weight percent, preferably from about 5 to 25 weight percent. Useful carboxylic acid containing copolymers are generally known in the art as are their methods of manufacture.

In one embodiment of the invention, the carboxylic acid containing copolymer is a styrene-acrylic acid copolymer, while in a second embodiment the carboxylic acid containing copolymer is a ethylene-acrylic acid copolymer and in a third embodiment, the carboxylic acid containing copolymer is a propylene-acrylic acid copolymer. In some embodiments, the carboxylic acid containing copolymer is a polymerization product of monomers of a vinyl monomer selected from the group consisting of styrene, ethylene and propylene with a carboxylic acid containing monomer selected from acrylic acid and methacrylic acid, and combinations comprising various combinations of the foregoing monomers.

The amount of carboxylic acid containing copolymer used in the compositions of the present invention can vary depending on the effectiveness of the particular copolymer to achieve the desired level of adhesion with the polyurethane foam. Generally, the level of carboxylic acid containing copolymer is within the range between about 1 weight percent and about 25 weight percent based on the combined weight of the polyphenylene ether and poly(alkenylaromatic) resins, more preferably within the range between about 7 weight percent and about 15 weight percent, and most preferably within the range between about 5 weight percent and about 10 weight percent all based on the combined weight of the polyphenylene ether and poly (alkenylaromatic) resins.

The addition of more than one acid containing copolymer may further enhance the adhesion of polyurethane foam to the resinous thermoplastic substrate. In one embodiment the carboxylic acid containing copolymer may be a combination of styrene-acrylic acid copolymer and ethylene-acrylic-acid copolymer, while in a second embodiment a combination of ethylene-acrylic acid copolymer and propylene-acrylic acid copolymer may be used. In a third embodiment propylene-acrylic acid copolymer may be used in conjunction with styrene-acrylic acid copolymer.

Also, the addition of a phenolic additive may further enhance the adhesion of polyurethane foam to the resinous thermoplastic substrate. For instance, the addition of a second additive such as Nirez™ 2150, which is a terpene phenol made from limonene and phenol, was found to increase the adhesive performance between the resinous thermoplastic substrate and the polyurethane foam.

In some embodiments an optional addition ingredient for providing enhanced adhesion is a urethane catalyst. Without being bound by any theory, it is presumed that the urethane catalyst promotes reactions between the carboxylic acid containing copolymer and the polyurethane foam. Examples of urethane catalysts include organometallic compounds including, e.g., tin or potassium carboxylates. Other compounds may include organotins such as dibutyltin dilaurate, dibutyl tinoxide and dioctyl tinoxide. Bismuth and Zinc compounds may also used. When used, the organotin catalyst is generally in a range between about 0.1% and about 10% by weight based upon the weight of the entire composition, preferably between about 0.5% and about 7% by weight, and more preferably, between about 3% and about 5% by weight.

The compositions of the present invention are prepared by mechanically blending the components in conventional mixing equipment, e.g., a single or twin screw extruder, Banbury mixer, or any other conventional melt compounding equipment. A vacuum may also be applied to during the compounding operation to further reduce odorous materials from the composition. The order in which the components of the composition are mixed is not generally critical and may be readily determined by one of skill in this art.

Further understanding of the present invention may be had from the following examples and comparative examples which are intended to illustrate, but not limit, the invention. All cited references are hereby incorporated herein in their entirety.

strips. The adhesion of the polyurethane foam to the plastic substrate covered with a mesh screen was accessed by pulling the foam apart from the substrate at 90 degree. The locus of failure, whether cohesive or adhesive was reported as noted in Table 2 and also discussed hereunder. ASTM D3359 procedure was used to rate the adhesion.

Styrene ethylene-butylene styrene saturated rubber from Kraton. Vancryl 65 (Styrene-acrylic acid copolymer) was purchased from Air Products and Chemicals, Inc. and Primacor 59901 (ethylene-acrylic acid copolymer) was purchased from Dow Chemical Company while Irganox 1010 was purchased from Ciba Specialty Chemicals. Cotin 100 and Fascat-4201 were bought from CasChem, Inc. and Atofina chemicals respectively while Hostastat HS-1 was obtained from Ciba Specialty Chemicals. (PPE) polyphenylene ether and (HIPS) high impact polystyrene were from General Electric Company.

TABLE 1

| Composition | Plaque 1 | Plaque 2 | Plaque 3 | Plaque 4 | Plaque 5 | Plaque 6 | Plaque 7 |
|---|---|---|---|---|---|---|---|
| PPE | 40 | 40 | 40 | 40 | 40 | 40 | 40 |
| HIPS | 60 | 60 | 60 | 60 | 60 | 60 | 60 |
| Vancryl 65 | | 1 | | 2 | | 1 | 1 |
| Primacor 59901 | | | 1 | | 2 | | |
| Cotin 100 | | | | | | 0.3 | |
| Fascat 4201 | | | | | | | 0.3 |
| Foam Adhesion | (1)No adhesion | (3)Marginal adhesion | (3)Marginal adhesion | (5)Good adhesion | (5)Good adhesion | (5)Good adhesion | (5)Good adhesion |

EXAMPLES

Example 1

To test the adhesion properties of various resin compositions of polyphenylene ether resin—poly(alkenylaromatic) compound with carboxylic acid containing copolymers, various test formulations were obtained as detailed in Table 1 hereunder:

The foam procedure that was used to formulate the resinous article with a foam polyurethane layer to be tested for adhesion follows: A very light coat of the food grade grease was applied with a paper towel to all interior surfaces of the foaming mold. The plaques tested (composition shown in Tables 1 and 2) were covered with a mesh screen and placed inside the mold. The mold contained 12 plaques at a time. The plaques were held on the bottom of the mold with a double-stick tape on their back surface. In a 1000 ml plastic disposable beaker, 382 grams of polyol Specflex NM815 (Dow Chemical) was weighed. In a separate 250 ml disposable beaker, 205 grams of polyisocyanate PAPI 95 (Dow Chemical) was added. Then, the polyisocyanate was poured into the polyol beaker, and the contents were quickly mixed with overhead mechanical stirrer with a stirring speed of 5,000 rpm for 10 seconds. The homogeneous mixture was poured into the foaming mold immediately after mixing and a cover was placed on the mold, then it was fastened with four cover clamps. After about 20 minutes the foamed plaques were removed from the mold by taking the mold apart. The plaques with the polyurethane foam on the surface were then conditioned for 24 hours at room temperature. The samples were then cut into several 1 inch wide Plaque 1 represents the standard formulation and is used as the control model without any adhesion promoter additives. The control blend Plaque 1 contains only poly(2,6-dimethyl-1,4-phenylene oxide) (PPE) and HIPS (high impact polystyrene). This material had very poor polyurethane foam adhesion. The foam in Plaque 1 separated from the substrate adhesively.

Plaque 2 had 40 parts by weight polyphenylene ether and 60 parts by weight HIPS plus 1 part by weight of Vancryl 65, which is a styrene-acrylic acid copolymer wherein the amount of acrylic acid is about 10 weight percent. The foam adhesion for Plaque 2 was significantly improved over Plaque 1. However, some adhesive failure in the polyurethane foam took place during the peel test.

Plaque 3 had 40 parts by weight polyphenylene ether and 60 parts by weight HIPS plus 1 part by weight of Primacor 59901, which is ethylene acrylic acid copolymer wherein the amount of acrylic acid is about 20 weight percent. The foam adhesion for Plaque 3 was significantly improved over Plaque 1. However, some adhesive failure in the polyurethane foam took place during the peel test.

Plaque 4 demonstrates the same composition as Plaque 2 except that about two (2) weight percent of Vancryl 65 is used in the PPE/HIPS formulation. Plaque 4 had excellent foam adhesion with the polyurethane foam. A complete cohesive failure occurred in the foam during the peel test on Plaque 4.

Plaque 5 demonstrates the same composition as Plaque 4 except that instead of Vancryl 65 it has 2% of Primacor 59901. Plaque 5 had excellent foam adhesion with the polyurethane foam. A complete cohesive failure occurred in the foam during the peel test on Plaque 5.

Plaque 6 demonstrates the same composition as Plaque 2 except that about 0.3 weight percent of Cotin 100, which is dibutyl tin oxide. Unexpectedly, it was discovered that just 0.3 weight percent of Cotin 100 significantly improved the foam adhesion performance.

Plaque 7 demonstrates the same composition as Plaque 6 except that instead of Cotin 100, it uses 0.3% of Fascat 4201, which is an organotin urethane catalyst. As noted by these data, as little as 0.3 percent of Fascat 4201 significantly improved the foam adhesion performance (5). A complete cohesive failure occurred in the polyurethane foam during the peel test on Plaque 7.

Example 2

A fourth sample, Plaque 4 was made using a combination of acid-containing materials and terpene phenolic resin additives to improve the urethane foam adhesion. The composition of the improved formulation are shown in Table 2.

TABLE 2

| Ingredient | Plaque 8 |
|---|---|
| PPE (0.40 intrinsic viscosity) | 36 |
| HIPS | 47 |
| Kraton G1651 (SEBS rubber) | 4 |
| Kraton D1101: Styrene-butadiene-Styrene unsaturated rubber | 4 |
| Hostastat HS-1 | 1.5 |
| Primacor 5990I Ethylene-acrylic acid copolymer | 1.5 |
| Cotin 100 (urethane catalyst) | 0.2 |
| ZnO/ZnS | 0.1/0.1 |
| Irganox 1010 (antioxidant) | 0.2 |
| Foam adhesion | Good |

The formulation shown in Plaque 8 was made employing both Nirez 2150, terpene phenol made by reacting limonene and phenol, Primacor 59901, and Cotin 100. The foam adhesion test that was conducted was similar to that of Example 1. The foam adhesion between the resinous substrate and the polyurethane foam was good.

As seen from the experimental data, the enhancement in adhesion achieved by using the resin with carboxylic acid containing copolymer is significant especially in conjunction with catalyst. Additionally, the compositions of the present invention exhibit reduced ammonia-like odors associated with amines that were previously used for improving adhesion.

Using the composition and method of the invention it would now be possible to provide thermoplastic articles of manufacture such as those used as an automotive instrument panel comprising thermoplastic substrate and polyurethane foam, exhibiting good adhesion between the polyurethane foam and the substrate material by way of a simple and cost effective process and also avoiding the problems of ammonia-like bad odor.

What is claimed:

1. A method for making a composition having improved adhesion to a polyurethane foam, said method comprising blending at least one polyphenylene ether, at least one poly(alkylenearomatic) compound, and at least one carboxylic acid containing copolymer, wherein the carboxylic acid containing copolymer is a polymerization product of monomers comprising
   one or more vinyl monomers selected from the group consisting of styrene, ethylene, and propylene and
   one or more vinyl carboxylic acids selected from the acrylic acid and methacrylic acid.

2. The method according to claim 1, wherein the carboxylic acid containing copolymer is one or more of styrene-acrylic acid copolymer, styrene-methacrylic acid copolymer, ethylene-acrylic acid copolymer, and ethylene-methacrylic acid copolymer.

3. The method according to claim 1, wherein the olefinic carboxylic acid residue in the copolymer is present from about 1 to 35 weight percent, based on the total weight of the copolymer.

4. The method according to claim 1, wherein the carboxylic acid containing copolymer is present at a level of about 1 weight percent and about 25 weight percent, based on the weight of the entire composition.

5. The method according claim 1, wherein the carboxylic acid containing copolymer is present at a level in the range between about 5 weight percent and about 15 weight percent, based on the weight of the entire composition.

6. The method according claim 1, further comprising blending a curing catalyst with the polyphenylene ether, the poly(alkylenearomatic) compound, and carboxylic acid containing copolymer.

7. The method according to claim 6, wherein the curing catalyst is selected from the group consisting of dibutyltin dilaurate, dibutyl tinoxide and dioctyl tinoxide.

8. The method according to claim 6, wherein the organotin compound is present at a level between about 0.1% and 10% based on the total weight of the composition.

9. The method according to claim 1 wherein the method further comprises addition of one or more additives selected from the group consisting of mold release compounds, flame retardants, additives, impact modifiers, antioxidants, stabilizers, fillers, and mixtures thereof.

10. The method according to claim 1, wherein the polyphenylene ether is present in an amount of about 20% to 80% by weight, the polystyrene is present in an amount of about 20% to about 80% by weight, both weight, being based on the combined weight of the poly(2,6-dimethyl-1, 4-phenylene ether) and polystyrene, and the carboxylic acid containing copolymer is present in an amount of at least about 2% to about 20% by weight of the total composition, wherein said composition resulting from the method does not lead to emission of ammonia-like odor.

11. The method according to claim 1, wherein the substrate further comprises a phenolic compound.

12. A composition having enhanced adhesion to polyurethane foam, said composition comprising at least one polyphenylene ether, at least one poly(alkenylaromatic) compound, and at least one carboxylic acid containing copolymer wherein the corboxylic acid containing copolymer is a polymerization product of monomers comprising
   one or more vinyl monomers selected from the group consisting of styrene, ethylene, and propylene and
   one or more vinyl carboxlic acids selected from acrylic acid and methacrylic acid.

13. The composition according to claim 12, wherein said composition the composition is substantially free of ammonia-like odors.

14. The composition according to claim 12, wherein the carboxylic acid containing copolymer is one or more of styrene-actylic acid copolymer, styrene-methacrylic acid copolymer, ethylene-acrylic acid copolymer, and ethylene-methacrylic acid copolymer.

15. The composition according to claim 12, wherein the olefinic carboxylic acid residue in the copolymer is present from about 1 to 35 weight percent, based on the total weight of the copolymer.

16. The composition according to claim 12, wherein the carboxylic acid containing copolymer is present at a level in the range between about 1 weight percent and about 25 weight percent, base&on the weight of the entire composition.

17. The composition according claim 12, further comprising at least one curing catalyst.

18. The composition according to claim 12, wherein the method further comprises addition of one or more additives selected from the group consisting of mold release compounds, flame retardants, additives, impact modifiers, antioxidants, stabilizers, fillers, and mixtures thereof.

19. The composition according to claim 17, wherein the curing catalyst is selected from the group consisting of dibutyltin dilaurate, dibutyl tinoxide and dioctyl tinoxide.

20. A composition having enhanced adhesion to polyurethane foam, said composition comprising at least one polyphenylene ether, at least one poly(alkenylaromatic) compound, and at least one carboxylic acid containing copolymer wherein the carboxylic acid containing copolymer is one or more of styrene-acrylic acid copolymer, styrene-methacrylic acid copolymer, ethylene-acrylic acid copolymer, and ethylene-methacrylic acid copolymer.

* * * * *

UNITED STATES PATENT AND TRADEMARK OFFICE
CERTIFICATE OF CORRECTION

PATENT NO. : 7,015,285 B2 Page 1 of 1
APPLICATION NO. : 10/325724
DATED : March 21, 2006
INVENTOR(S) : Mhetar et al.

It is certified that error appears in the above-identified patent and that said Letters Patent is hereby corrected as shown below:

Column 1:
Line 30, after "added" insert -- to --
Column 2:
Line 66, after "and" delete "40;000" and insert therefor -- 40,000 --
Column 3:
Line 33, after "rene," delete "alpha." and insert therefor -- alpha --
Column 4:
Line 17, after "is" delete "a" and insert therefor -- an --
Line 66, after "and" (second occurrence) delete "Zinc" and insert therefor -- zinc --
Column 7:
Line 19, after "formulation" delete "are" and insert therefor -- is --
Line 63, before "acid" (first occurrence) delete "lie" and insert therefor -- lic --
Column 8:
Line 1, after "from" delete "the"
Line 18, after "according" insert -- to --
Line 22, after "according" insert -- to --
Line 42, after "both" delete "weight," and insert therefor -- weights --
Line 56, after "the" delete "corboxylic" and insert therefor -- carboxylic --
Line 60, after "vinyl" delete "carboxlic" and insert therefor -- carboxylic --
Line 64, after "composition" delete "the composition"
Column 9:
Line 11, after "percent" delete "base&on" and insert therefor -- based on --
Line 13, after "according" insert -- to --

Signed and Sealed this

Twenty-eighth Day of November, 2006

JON W. DUDAS
*Director of the United States Patent and Trademark Office*